US009280870B2

(12) United States Patent
Aoki et al.

(10) Patent No.: US 9,280,870 B2

(45) Date of Patent: Mar. 8, 2016

(54) GAMING SYSTEM HAVING PASSIVE PLAYER PARTICIPATION IN SECONDARY WAGERING GAMES

(71) Applicant: Bally Gaming, Inc., Las Vegas, NV (US)

(72) Inventors: Dion K. Aoki, Santa Monica, CA (US); Christopher R. Barney, Henderson, NV (US); Andrew C. Guinn, Chicago, IL (US); Jeremie D. Moll, Las Vegas, NV (US); Jorge L. Shimabukuro, Las Vegas, NV (US); Alfred Thomas, Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

(21) Appl. No.: 14/829,112

(22) Filed: Aug. 18, 2015

(65) Prior Publication Data

US 2015/0356824 A1 Dec. 10, 2015

Related U.S. Application Data

(63) Continuation of application No. 14/306,995, filed on Jun. 17, 2014, now Pat. No. 9,142,091, which is a continuation of application No. 12/669,350, filed as application No. PCT/US2008/008603 on Jul. 15, 2008, now Pat. No. 8,790,175.

(60) Provisional application No. 60/961,011, filed on Jul. 18, 2007.

(51) Int. Cl.
*A63F 13/00* (2014.01)
*G07F 17/32* (2006.01)

(52) U.S. Cl.
CPC ........ *G07F 17/3244* (2013.01); *G07F 17/3225* (2013.01)

(58) Field of Classification Search
CPC ... G07F 17/32; G07F 17/323; G07F 17/3244; G07F 17/3269
USPC .......................................... 463/16, 20, 25, 29
See application file for complete search history.

(56) References Cited

U.S. PATENT DOCUMENTS 5,779,544 A * 7/1998 Seelig ................. G07F 17/3211 273/143 R
6,793,575 B2 9/2004 Brown (Continued)

FOREIGN PATENT DOCUMENTS

WO WO 2008/011089 1/2008

OTHER PUBLICATIONS

International Preliminary Report on Patentability for PCT/US2008/008603, dated May 10, 2010 (6 pages).

(Continued)

*Primary Examiner* — Allen Chan
(74) *Attorney, Agent, or Firm* — Nixon Peabody LLP

(57) ABSTRACT

A gaming system comprises a wager input device for receiving a primary wager from a player, the player associated with a player account, and at least one display for displaying a primary wagering game and a secondary wagering game. Secondary wagering game outcomes are independent of the primary wagering game. The system further comprises a controller operative to cause the at least one display to display a randomly selected outcome of the primary wagering game; upon the occurrence of a first triggering event, enter a player into the secondary wagering game, wherein the player is represented in the secondary wagering game by a player avatar; upon the occurrence of a second triggering event, end the player's participation in the secondary wagering game; award the player any awards collected by the player avatar in the secondary wagering game; and credit the player account by the amount of the collected awards.

20 Claims, 11 Drawing Sheets

(56) References Cited

U.S. PATENT DOCUMENTS

| | | | | |
|---|---|---|---|---|
| 6,984,174 | B2 * | 1/2006 | Cannon | G07F 17/32 340/323 R |
| 7,384,337 | B2 | 6/2008 | Thomas | |
| 2002/0002078 | A1 * | 1/2002 | Jaffe | A63F 13/10 463/30 |
| 2003/0064772 | A1 | 4/2003 | Tempest | |
| 2004/0048645 | A1 | 3/2004 | Webb | |
| 2005/0020340 | A1 | 1/2005 | Cannon | |
| 2005/0101368 | A1 | 5/2005 | Thomas | |
| 2005/0181860 | A1 * | 8/2005 | Nguyen | G07F 17/3267 463/20 |
| 2005/0233796 | A1 | 10/2005 | Baerlocher | |

OTHER PUBLICATIONS

International Search Report for PCT/US2008/08603, dated Oct. 31, (5 pages).

Written Opinion for PCT/US2008,008603, dated Oct. 29, 2008 (4 pages).

* cited by examiner

GAMING SYSTEM HAVING PASSIVE PLAYER PARTICIPATION IN SECONDARY WAGERING GAMES

CROSS-REFERENCE TO RELATED APPLICATIONS

This application is a continuation of U.S. patent application Ser. No. 14/306,995, filed Jun. 17, 2014, now allowed, which is a continuation of U.S. patent application Ser. No. 12/669,350, filed Jun. 7, 2010, now U.S. Pat. No. 8,790,175, which is a U.S. national stage of International Application No. PCT/US2008/008603, filed Jul. 15, 2008, which is related to and claims the benefit of U.S. Provisional Application No. 60/961,011, filed Jul. 18, 2007, each of which are hereby incorporated by reference herein in their entireties.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a gaming system having passive player participation in secondary wagering games.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming systems with new types of bonus games to satisfy the demands of players and operators.

Traditionally, wagering games and systems which employ bonus games require active participation by players in the secondary wagering events. One problem that arises is that such a configuration takes time away from a player's continued participation in primary wagering games, and thus detracts from additional wagers being received from the player. This causes unnecessary loss of profits to wagering game operators. Another problem that arises is that traditional bonusing systems often lack the ability to identify a player by a player account or other identifier, thereby requiring the player to be present when the secondary wagering event takes place. Such traditional systems fail to offer incentives for players to sign up for a player account so as to be identifiable by wagering game operators. Yet another problem that arises is that traditional bonus games fail to offer time based participation of players rather than event based participation in secondary games. The present invention is directed to solving these and other problems.

SUMMARY OF THE INVENTION

According to one aspect of the present invention, a gaming system comprises a wager input device for receiving a primary wager from a player, the player associated with a player account, and at least one display for displaying a primary wagering game and a secondary wagering game. Outcomes of the secondary wagering game are independent of the primary wagering game. The system further comprises a controller operative to (i) cause the at least one display to display a randomly selected outcome of the primary wagering game, (ii) upon the occurrence of a first triggering event, enter a player into the secondary wagering game, wherein the player is represented in the secondary wagering game by a player avatar, (iii) upon the occurrence of a second triggering event, end the player's participation in the secondary wagering game, (iv) award the player any awards collected by the player avatar in the secondary wagering game, and (v) credit the player account by the amount of the collected awards.

According to another aspect of the invention, a method of operating a wagering game comprises receiving a primary wager from a player, the player associated with a player account and displaying a primary wagering game and a secondary wagering game, wherein outcomes of the secondary wagering game are independent of the primary wagering game. The method further comprises displaying a randomly selected outcome of the primary wagering game and upon the occurrence of a first triggering event, entering the player into the secondary wagering game, wherein the player is represented in the secondary wagering game by a player avatar. The method further comprises, upon the occurrence of a second triggering event, ending the player's participation in the secondary wagering game, awarding the player any awards collected by the player avatar in the secondary wagering game, and crediting the player account by the amount of the collected awards.

According to yet another aspect of the invention, a method of operating a secondary wagering game, comprises receiving a first wager from a first player of a first primary wagering game and displaying one or more outcomes of the first primary wagering game. The method further comprises receiving a second wager from a second player of a second primary wagering game and displaying one or more outcomes of the second primary wagering game. The method further comprises, in response to a first triggering event, entering the first player into the secondary wagering game at Time A for a period of X seconds. The method further comprises, in response to a second triggering event, entering the second player into the secondary wagering game at Time B for a period of Y seconds, wherein either (i) Time B is after Time A, or (ii) X does not equal Y, or both (i) and (ii).

According to yet another aspect of the invention, a computer readable storage medium is encoded with instructions for directing a gaming system to perform the above methods.

Additional aspects of the invention will be apparent to those of ordinary skill in the art in view of the detailed description of various embodiments, which is made with reference to the drawings, a brief description of which is provided below.

DETAILED DESCRIPTION

Figure 1A:
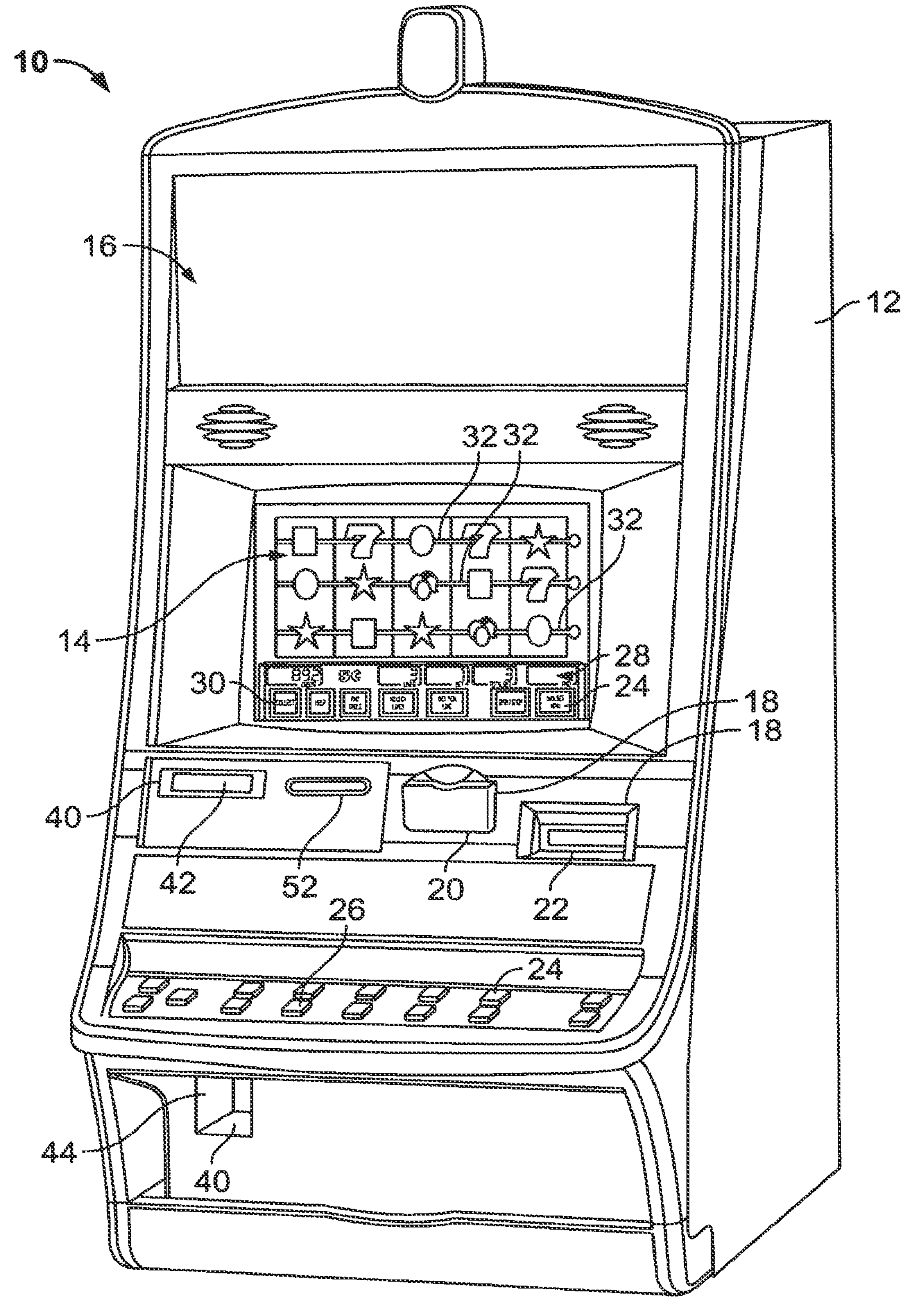
FIG. 1*a* is a perspective view of a free standing gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1*a*, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, any other game compatible with a display comprising at least one symbol-bearing reel strip. The gaming machine 10 may also be a hybrid gaming machine integrating both electronic and electromechanical displays.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1*a*). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of operating the game, while the touch keys 30 may allow for input needed for another aspect of the game.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 of the gaming machine 10 may include a number of mechanical reels to display the outcome in visual association with at least one payline 32. Alternatively, the primary display 14 may take the form of a hybrid display incorporating both electromechanical display components, such as reels, with an electronic display, which may include a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1*a* as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
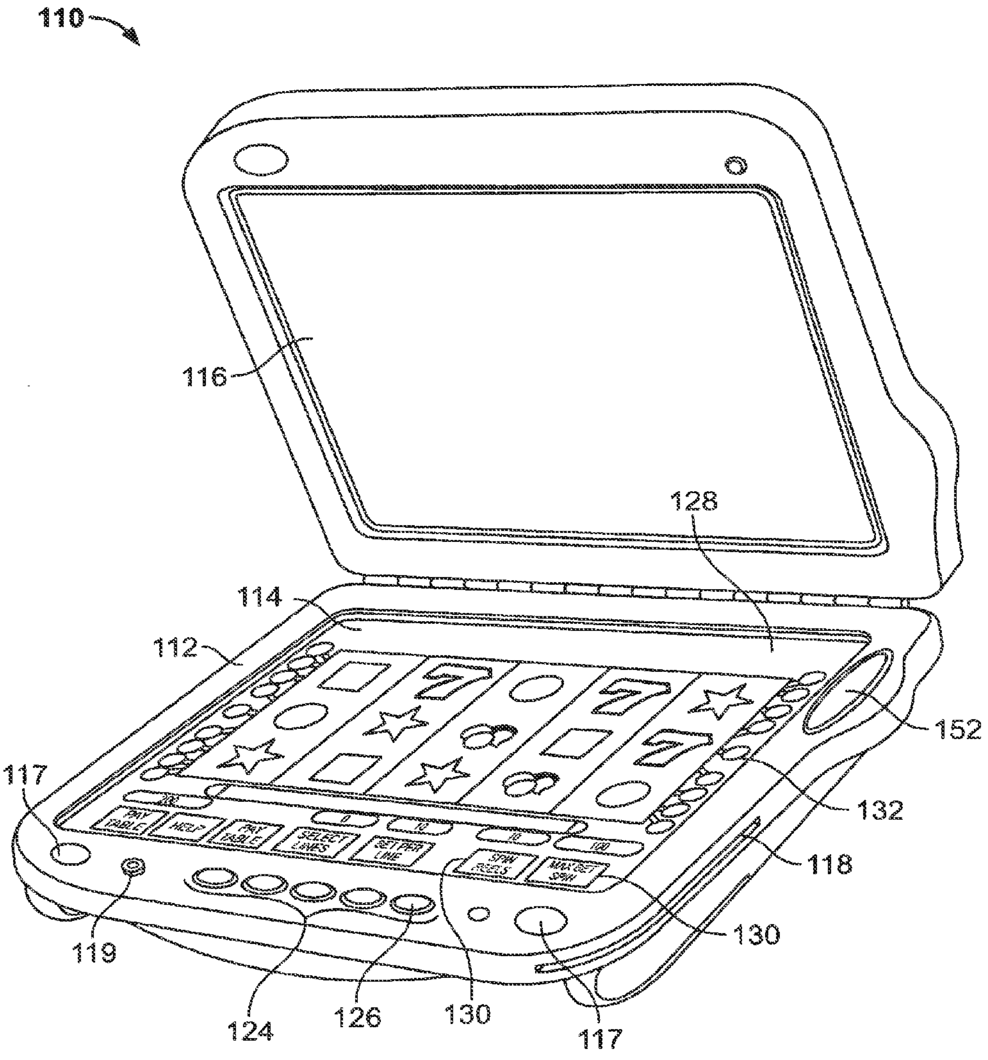
FIG. 1*b* is a perspective view of a handheld gaming machine embodying the present invention.

Depicted in FIG. 1*b* is a handheld or mobile gaming machine 110. Like the free standing gaming machine 10, the handheld gaming machine 110 is preferably an electromechanical gaming machine configured to play mechanical slots, any other game compatible with a display comprising at least one symbol-bearing reel strip. The handheld gaming machine 110 may also be a hybrid gaming machine integrating both electronic and electromechanical displays. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a players account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen 128 mounted to a primary display 114 and/or secondary display 116. In one aspect, the touch screen 128 is matched to a display screen having one or more selectable touch keys 130 selectable by a user's touching of the associated area of the screen using a finger or a tool, such as a stylus pointer. A player enables a desired function either by touching the touch screen 128 at an appropriate touch key 130 or by pressing an appropriate push button 126 on the button panel. The touch keys 130 may be used to implement the same functions as push buttons 126. Alternatively, the push buttons 126 may provide inputs for one aspect of the operating the game, while the touch keys 130 may allow for input needed for another aspect of the game. The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably includes a number of mechanical reels to display the outcome in visual association with at least one payline. Alternatively, the primary display 114 may take the form of a hybrid display incorporating both electromechanical display components, such as reels, with an electronic display, which may include a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 118 or an assignment of credits stored on the handheld gaming machine via the player input device 124, e.g. the touch screen keys 130 or push buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1*b*, comprises a biometric sensing device.

Figure 2:
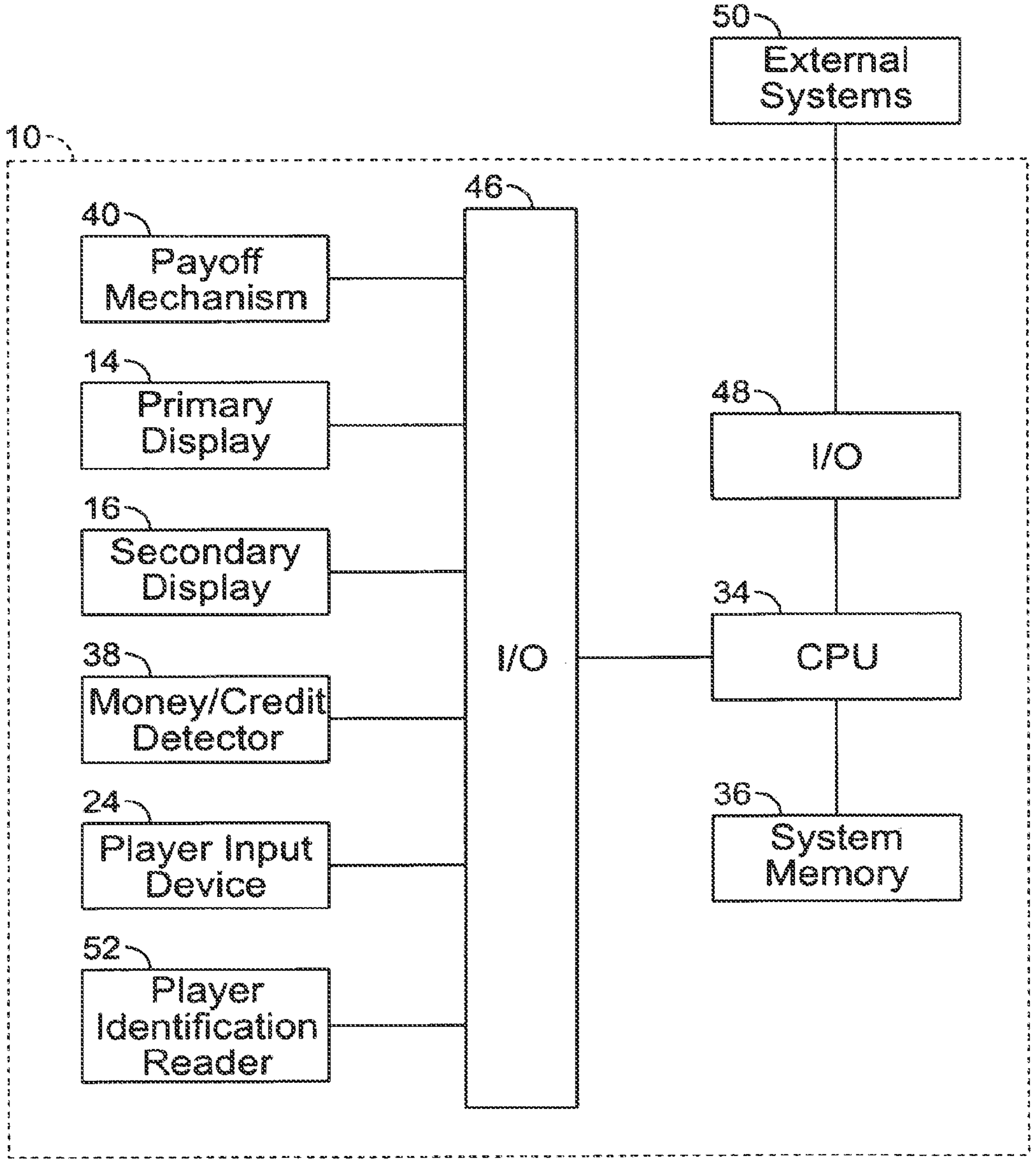
FIG. 2 is a block diagram of a control system suitable for operating the gaming machines of FIGS. 1*a* and 1*b;*

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1*a*, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46,

48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10,110 may communicate with external systems 50 (in a wired or wireless manner) such that each machine operates as a "thin client," having relatively less functionality, a "thick client," having relatively more functionality, or through any range of functionality there between. As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "thicker client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10,110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

Figure 3:
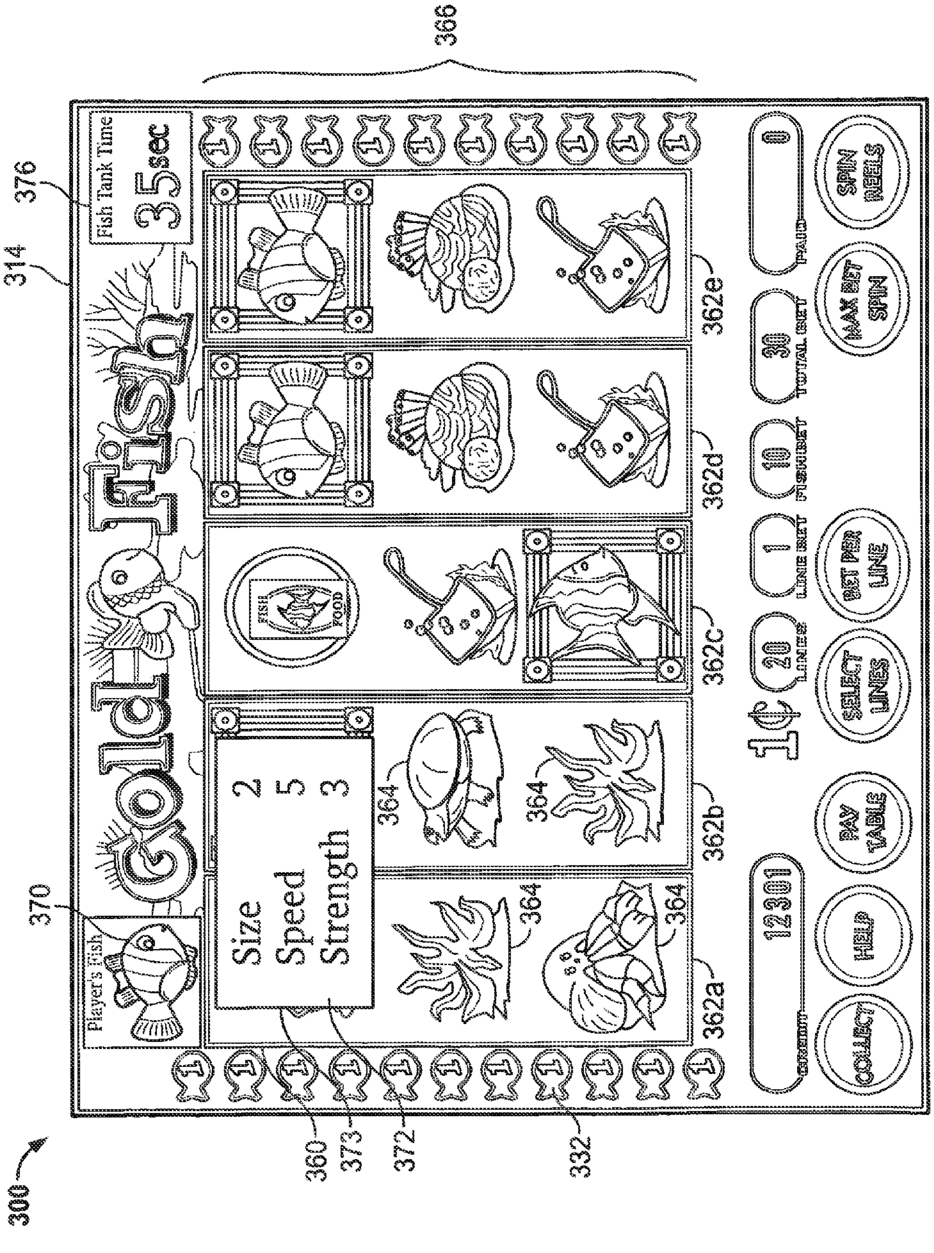
FIG. 3 is a screen shot of a primary wagering game of a gaming system.

Turning now to FIG. 3, a primary display 314 of a gaming system 300 is shown. The primary display 314 may be any form of display such as those described herein with reference to the free standing and handheld gaming devices of FIGS. 1*a* and 1*b*. The primary display 314 includes display of a primary wagering game 360, which in this embodiment is a slot game as shown in FIG. 3. The slot game 360 includes a plurality of reels 362*a,b,c,d,e* which may be either electro-mechanical reels or simulations thereof on the primary display 314. The reels 362*a,b,c,d,e* include a plurality of symbols 364 displayed thereon which vary as the reels 362*a,b,c,d,e* are spun and stopped. The symbols 364 may include any variety of graphical symbols, elements, or representations, including symbols 364 which are associated with one or more themes of the gaming machine or system. The symbols 364 may also include a blank symbol, or empty space. As described herein the symbols 364 landing on the active paylines 332 (the paylines for which a wager has been received) are evaluated for winning combinations. If a winning combination of symbols 364 lands on an active payline 332 a primary award is awarded in accordance with a pay table of the gaming device. The symbols 364 on the reels 362*a,b,c,d,e* form an array 366 or matrix of symbols 364, having a number of rows and columns, which in the embodiment shown is four rows and five columns. In alternate embodiments, the array 366 may have greater or fewer symbols 364, and may take on a variety of different forms having greater or fewer rows and/or columns. The array 366 may even comprise other non-rectangular forms or arrangements of symbols 364.

In addition to the primary wagering game 360, the primary display 314 includes a player icon, character or avatar 370. The player avatar 370 is associated with the player through a player account or other player identifier, as described above herein. When a player commences play of the primary wagering game 360, he or she is identified by way of a player identifier, such as a player tracking card or biometric identifier. A player account associated with the player is activated, and the player avatar 370 associated with the player is recalled from memory of the gaming system 300 so as to be displayed on the primary display 314. The player may be associated with one or more avatars, each of which may be specific to a theme associated with the primary wagering game 360. For example, as seen in FIG. 3, the primary wagering game is a "Gold Fish" game, so the player's avatar 370 is represented by a fish, shown under the label "Player's Fish." Other avatars may be used with other game themes, such that a player may play a plurality of wagering games and view different avatars associated with the different wagering games. The upper right hand corner of the primary display 314 includes a bonus time meter 376 as described further herein.

The player avatar 370 may have one or more attributes 372 associated with it, which may be usable in a secondary wagering game, described later herein. The attributes 372 may include features of the avatar 370 such as size, speed, color, dexterity, strength, skill, etc. The attributes 372 may be viewable on the display 314, for example by way of a pop-up window 373 that appears when the player avatar 370 is touched or selected, as shown in FIG. 3. In the embodiment shown, the player avatar 370 has attributes 372 which include size, speed and strength, shown on a scale of 1 to 5. The player may be given opportunities to customize his player avatar 370, and the attributes 372 thereof, either through play of the primary wagering game 360, or otherwise. Thus, the player may configure his avatar 370 to have attributes 372 that the player feels is most desirable for entry and competition into the secondary wagering game. In other embodiments, the player avatar 370 may be preconfigured by the gaming system 300. The primary display 314 may display the attributes 372 of the player avatar 370 so that the player is informed as to the attributes 372 so as to be able to customize them.

Figure 4:
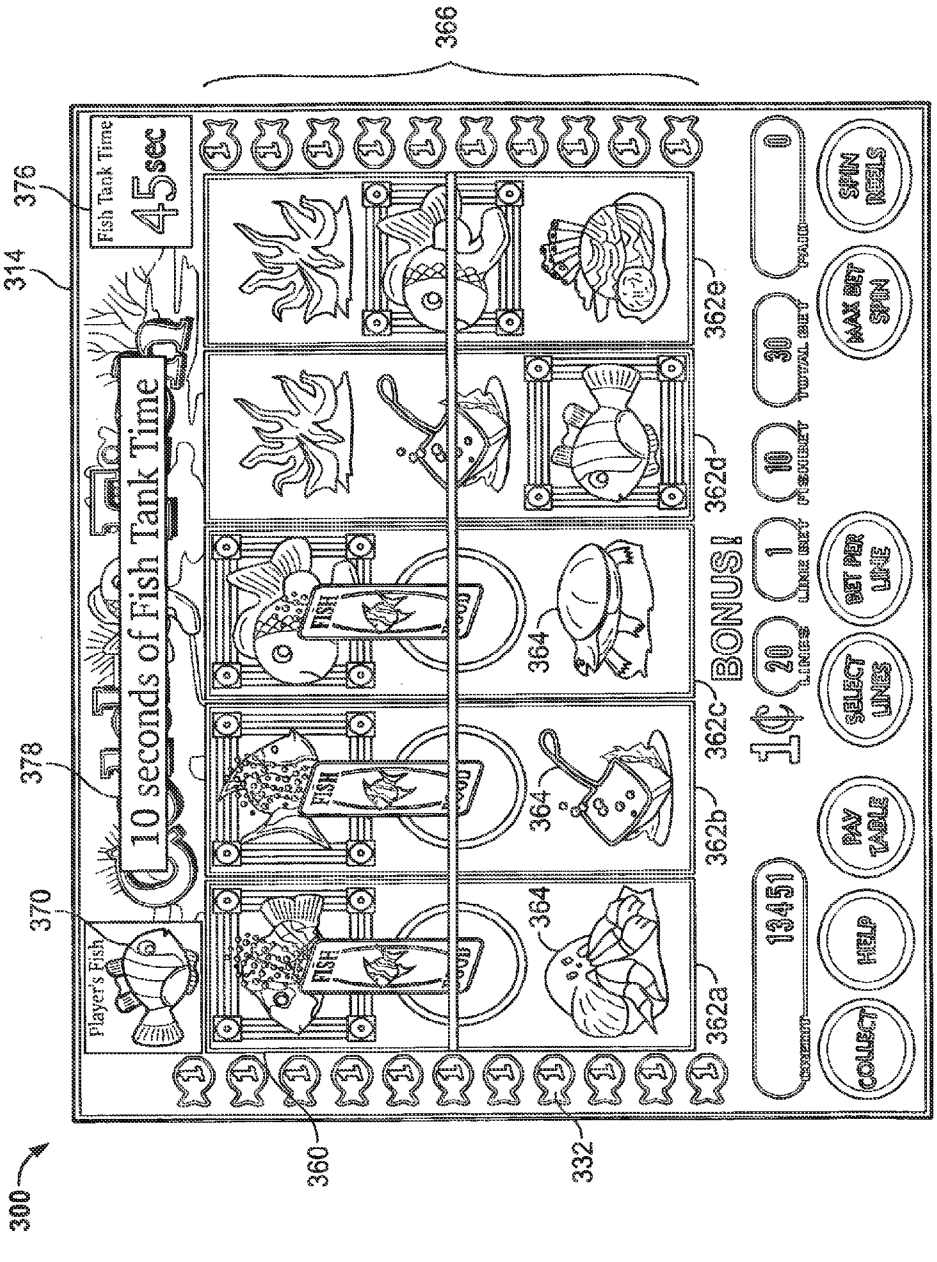
FIG. 4 is a screen shot of the primary wagering game of FIG. 3, showing a winning outcome including an award of time eligibility.

Turning to FIG. 4, during play of the primary wagering game 360, the player accumulates awards, points, or other eligibility criteria which qualify the player for entry and participation in the secondary wagering game, described later herein. For example, certain outcomes of the primary wagering game 360 may provide the player with time eligibility for the secondary wagering game. In FIG. 3, the player has previously accumulated 35 seconds of eligibility in the secondary wagering game, as displayed in a bonus time meter 376 (entitled "Fish Tank Time") displayed in the upper right hand corner of the primary display 314. In FIG. 4, the player has achieved a winning combination on this particular play of the primary wagering game 360, which in this embodiment is three "Fish Food" symbols in a row on an active payline 332. In this particular embodiment, three or more "Fish Food" symbols award the player additional time eligibility in the bonus time meter 376. In this instance, the player has been awarded an additional 10 seconds of eligibility for participation in the secondary wagering game, as seen in the information label 378 at the top of the display 314. Thus, the bonus time meter 376 has been updated to reflect the players' cumulative time eligibility of 45 seconds (previous balance of 35 seconds plus the 10 seconds awarded on this play of the wagering game 360). The player continues play of the primary wagering game 360 until either the player terminates his playing session, or the player achieves a triggering event for commencement of the secondary game, or both.

Figure 5:
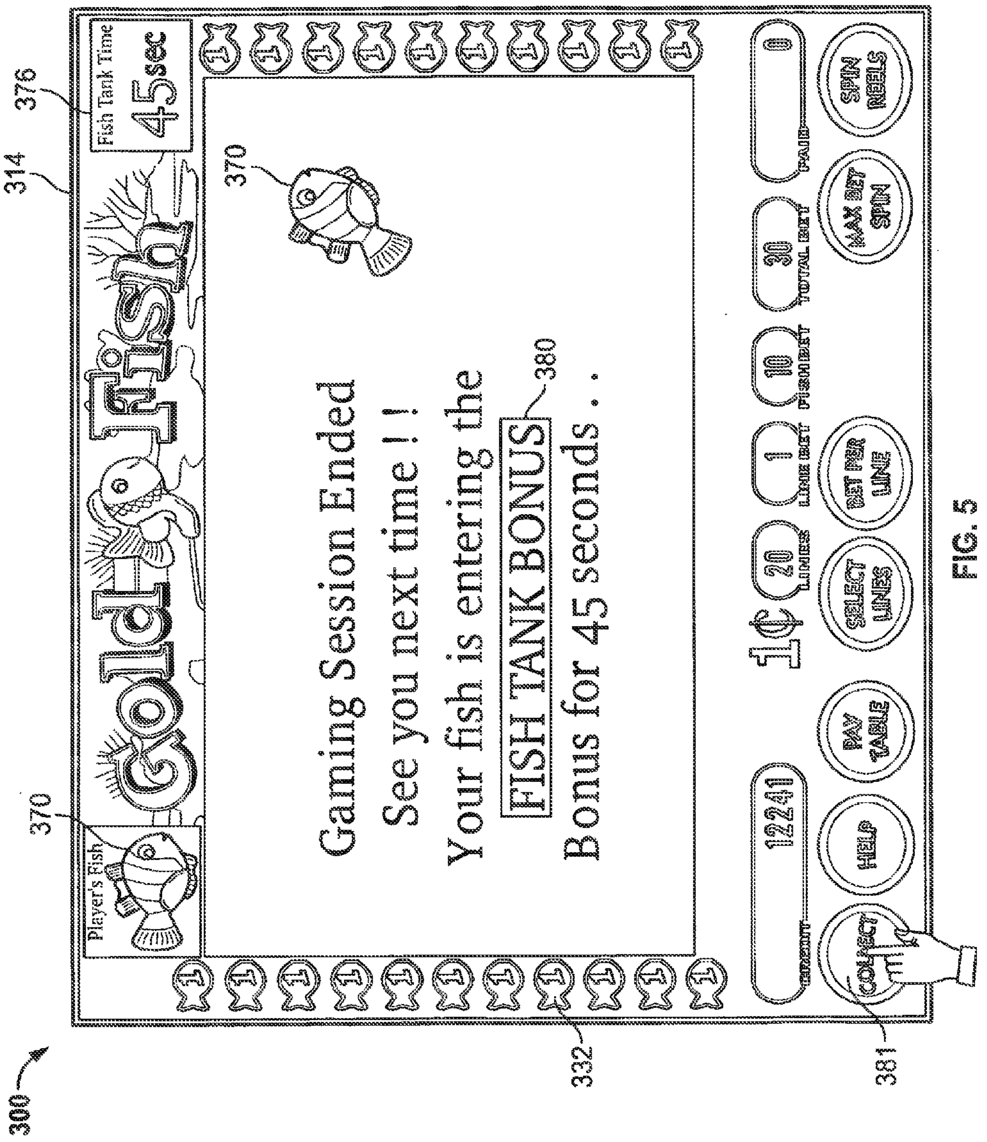
FIG. 5 is a screen shot of the conclusion of play of a primary wagering game and commencement of a secondary wagering game.

Turning to FIG. 5, upon the occurrence of a first triggering event, the player is entered into a secondary wagering game 380, if the player is eligible. Thus, in an embodiment, a player must have a positive balance in his bonus time meter 376 in order to be eligible for the secondary wagering game. In the embodiment shown, the first triggering event comprises the player's termination of his gaming session at the primary wagering game 360. In other words, the player participates in the secondary wagering game 380 upon completion of his gaming session. As seen in FIG. 5, the player has selected the "Collect" icon 381 on the bottom of the display 314 to cash out and terminate his gaming session of the primary wagering game 360. In this way, the player is free to leave to go play another primary wagering game, or to go home or anywhere else. Because the player is represented by a player avatar 370 associated with the player's account, the player need not be present to participate in the secondary wagering game 380. The player can watch the display of the secondary wagering game 380 if he chooses, but need not do so. The secondary wagering game 380 can take place without player interaction or input, and thus the player is a passive participant in the secondary wagering game 380, as described further herein. In an alternative embodiment, the first triggering event is a particular outcome of the primary wagering game 360, such that when the outcome is achieved, the secondary wagering game 380 automatically commences. In other embodiments, many other events can be utilized as the first triggering event, such as time on device, total amount of wagers input (coin-in), or random events. Upon pressing or selecting the "Collect" icon 381, the player receives notification via the primary display 314 that the gaming session has terminated and that the secondary wagering game 380 is commencing. In an embodiment, the notification includes the player's time eligibility balance of 45 seconds from the bonus time meter 376.

Figure 6:
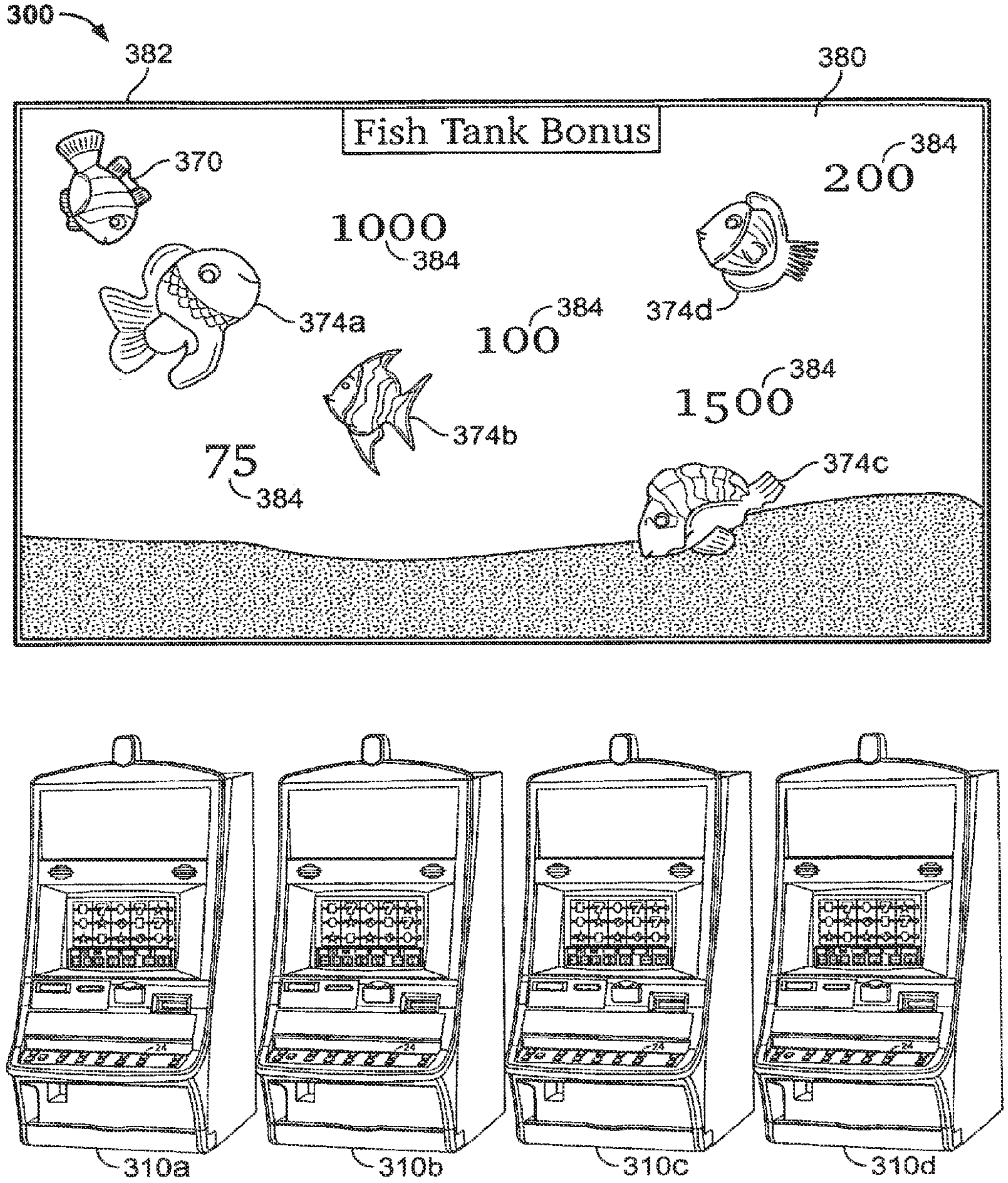
FIG. 6 is a perspective view of a gaming system including a secondary display displaying a secondary wagering game.

Turning to FIG. 6, a secondary display 382, such as a plasma display mounted above one or more gaming devices 310*a-d* in a casino, displays a secondary wagering game 380. In this embodiment, the secondary wagering game 380 is a "Fish Tank Bonus" which is thematically related to the primary wagering game 360 played by the eligible player. The player is represented by his player avatar 370 which enters and navigates the fish tank virtual world of the secondary wagering game 380. In doing so, the player avatar 370 interacts with other elements in the virtual world of the secondary wagering game 380, such as other fish, plants, sea life, food, awards, prizes, etc. In an embodiment, the player avatar 370 swims through the virtual world of the fish tank along with other supplemental avatars 374*a,b,c,d*. The supplemental avatars 374*a,b,c,d* may represent other players participating in the secondary wagering game 380, or may represent computer players, or may simply be decorative graphics as part of the virtual world. As the player avatar 370 navigates and interacts with the virtual world, the player avatar 370 collects awards 384 or prizes dispersed throughout the virtual world. For example, the player avatar 370 may eat other fish, eat food, or find awards 384 and prizes floating in the water or buried in the sand at the bottom of the fish tank. In doing so, the player avatar 370 accumulates awards 384 such as credit awards and prizes, which are credited to the player's account associated with the player and the avatar 370.

In an embodiment, the amount of bonus awards 384 that the avatar 370 collects during participation in the secondary wagering game 380 is dependent on one or more of the attributes 372 of the avatar 370, as previously configured by the player. The bonus awards 384 may also be dependent upon complimentary conditions of the virtual world which are compared with the attributes 372 of the avatar 370. For example, the virtual world may vary so as to have fast moving food (which a fast fish avatar is more easily capable of capturing and eating), strong currents (which affect smaller fish more than larger fish), deeper placement of awards (which are more easily retrieved by stronger fish), etc. Thus, one or more rule sets may be employed in the secondary wagering game 380 so as to resolve the characteristics of the attributes 372 of the avatar 370 against the conditions of the virtual world, and award bonus awards 384 to the avatar 370 accordingly.

Figure 7:
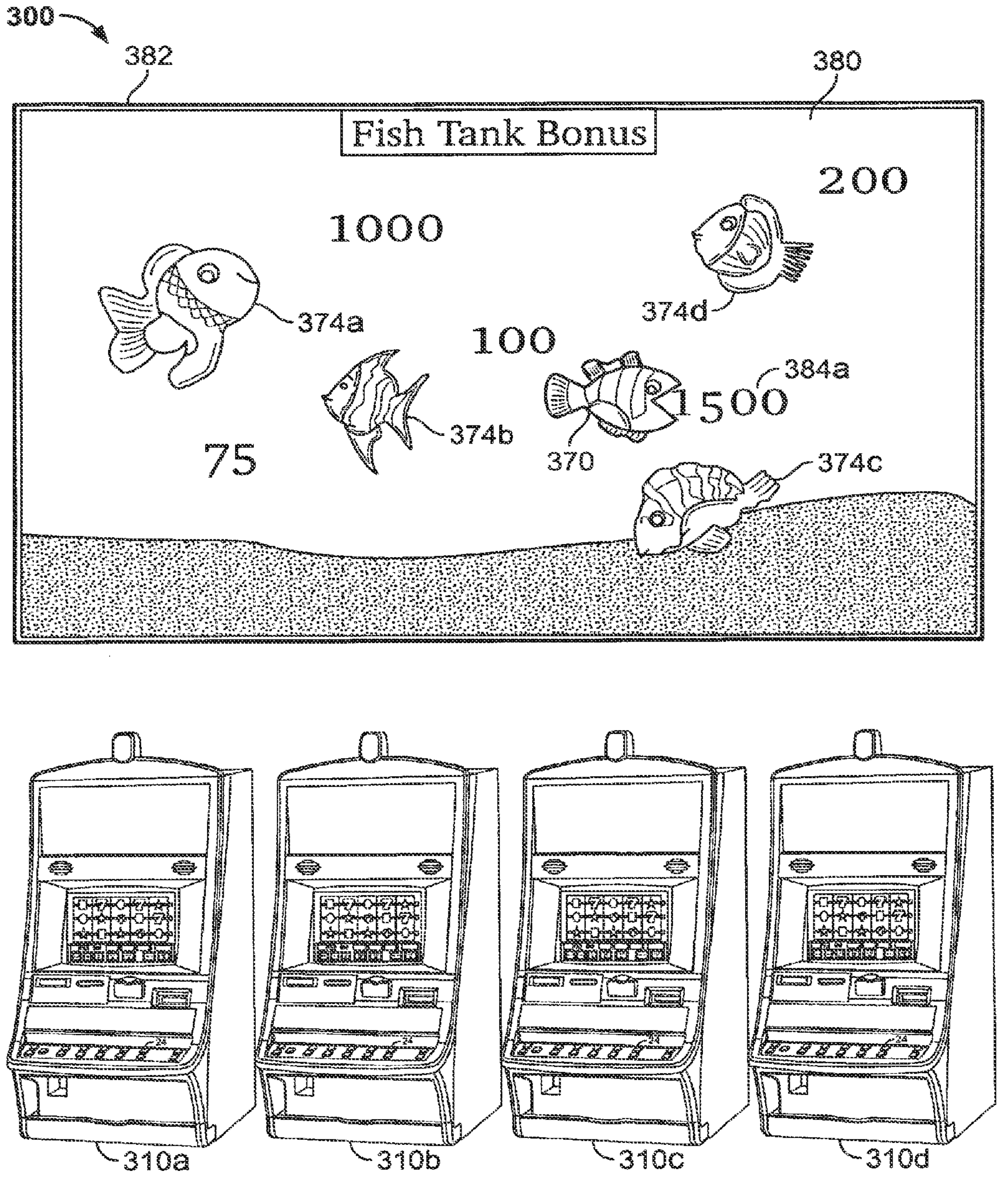
FIG. 7 is the gaming system of FIG. 6, depicting progression of the secondary wagering game.

In FIG. 7, the player's avatar 370 continues to participate in the secondary wagering game 380 in the fish tank, as displayed on the secondary display 382. As seen in FIG. 7, the player's avatar 370 fish continues to swim about the fish tank. The avatar 370 encounters a first award 384*a* of 1,500 credits, which the player's avatar 370 eats or consumes. The 1,500 credit award 384*a* is thus awarded to the player, and added to the player's account associated with the avatar 370. The supplemental avatars 374*a,b,c,d* continue to swim about the tank and eat other awards 384, and otherwise interact within the virtual world of the secondary wagering game 380. By eating the other awards 384, the supplemental avatars 374*a, b,c,d* remove them from being available to be eaten by the player avatar 370 and awarded to the player. In an embodiment, the supplemental avatars 374*a,b,c,d* may directly interact or compete with the player avatar 370, such as in a race, a fight, or other competition, or even in a collaborative manner. The player avatar 370 continues to swim about the virtual world of the supplemental wagering game 380 and collect awards 384 so long as the player has time remaining in his bonus time eligibility meter 376.

Figure 8:
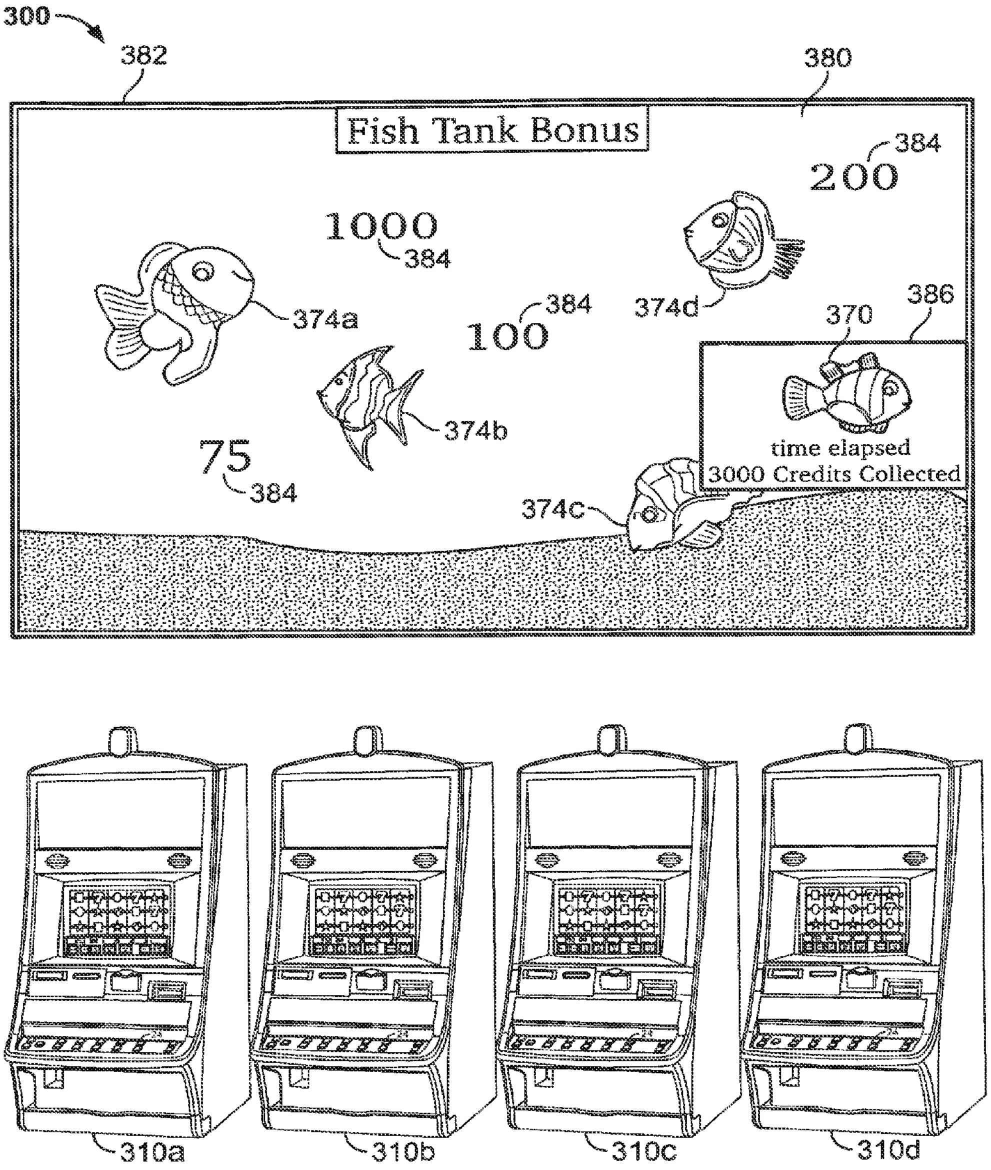
FIG. 8 is the gaming system of FIG. 6, depicting a conclusion of the secondary wagering game.

The player continues to participate in the secondary wagering game 380 until a second triggering event occurs. Thus, in an embodiment, the player's avatar 370 continues to navigate the virtual fish tank world of the secondary wagering game 380 and collect awards 384. In an embodiment, the secondary triggering event is the expiration of the bonus time eligibility shown in the bonus time meter 376. Thus, as seen in FIG. 8, the player's fish avatar 370 has collected 3,000 credits during the 45 seconds of eligibility in which the avatar 370 swam in the fish tank. An information banner 386 pops up which includes an image of the player's avatar 370 and a message indicating that the player's bonus time eligibility 376 has expired. In this embodiment, the information banner states "time elapsed." The information banner 386 further includes a summary of the credits and awards 384 won by the player's avatar 370, which in this instance was 3,000 credits. The credits, prizes and awards accumulated by the avatar 370 during the secondary wagering game 380 are credited to the player account associated with the player and the player avatar 372. The player can learn the amount of bonus awards 384 earned during the secondary wagering game 380 by checking his player account balance, for example, when he returns to the casino, or even online.

In other embodiments, other second triggering events may be used to terminate a player's participation in the secondary wagering game 360. For example, a player may be allowed to continue until his avatar 370 is eaten or defeated by another player's avatar 374 in the fish tank. Moreover, the second triggering event may comprise achieving a certain total collection of bonus awards 384 or credits, winning a certain number of bonus awards 384, or engaging in a certain predetermined number or sequence of events in the virtual world of the secondary wagering game 380. Moreover, the second triggering event may comprise depletion or other adjustments of attributes 372 assigned to an avatar 370. One or more intervening triggering events occurring during play of the secondary wagering game 380, may further adjust the length of time that a player's avatar 370 participates in the secondary wagering game 380. For example, various intervening triggering events may add time to a player's bonus time meter 376, subtract time there from, increase or decrease certain player attributes 374, etc.

In yet other embodiments, the secondary wagering game may take on many other forms, themes, configurations, and designs. In alternative embodiments, the secondary wagering game may involve group play, such as team play, competition, or collaborative efforts where the player's avatar interacts with other player's avatars. In yet other alternative embodiments, the secondary wagering game may include adventures, episodes, or experiences in a variety of virtual worlds, arenas, or atmospheres. The secondary wagering game can take on virtually any form which allows the player to passively participate and collect awards. The secondary wagering game may include animations, sounds, and entertaining content accompanying the display of the player's avatar interacting with the virtual world displayed or contained therein. Moreover, the secondary wagering game may be organized in stages, levels, scenes, episodes, etc. such that a player's avatar may progress through different portions of the game. In yet other embodiments, player's may be permitted to customize their avatar based upon assets or attributes collected, either through play of primary wagering games, secondary wagering games, or elsewhere. The secondary wagering game may also permit the player to collect, improve, use, or otherwise change the attributes of his or her player avatar during play.

In one alternative embodiment, the virtual world of the secondary wagering game may be a map wherein the player participating in the game is permitted to place an icon, such as an oil well, on a particular location on the map. The random determination of awards may include awarding credits to players by having various amounts of "oil" pumped out of the wells. In this way, the player's participation in the game comprises staking out a claim or territory, in hopes that it will be more favorably awarded at a future time. In another alternative embodiment, the player's participation may be having his player account associated with a particular symbol of a primary wagering game played on a set or bank of gaming device. Thus, after the player leaves the casino, the player shares in winning outcomes on those predetermined gaming devices which are displayed which include the designated symbol. Every time that symbol comes up as part of a winning combination, the player associated with the symbol is given an award, which may or may not be a function of the size of the award for the winning outcome displayed. In this way, the player's participation in the secondary wagering game is passive by "piggy backing" on other player's outcomes.

In a similar alternative embodiment, the secondary wagering game 380 may be a board game in which a plurality of players participate. For example, in an embodiment, the players participating in the secondary wagering game 380 play a game of Monopoly™, and a Monopoly™ board, playing pieces, and properties are displayed on the secondary display 382. The players may be allowed to take turns rolling the dice and navigating the playing field or board, landing on properties and revealing various outcomes, which may include the awards 384 described herein. Moreover, players may be permitted to build houses, hotels, and place other assets in the environment of the secondary wagering game 380 such that when those assets interact with other players, the initiating player is awarded a prize. For example, a player may build a house or hotel on a given property and receive an award every time another player lands on that property on the Monopoly™ Board. In this way, in addition to owning or controlling a certain portion or property of the secondary wagering game 380, the owning player is provided an opportunity to make modifications, additions, or enhancements to such property in an effort to increase his award levels. Other board game and interactive configurations are possible as well.

The outcome of the player's participation in the secondary wagering game 380 may be predetermined (for example upon conclusion of play of the primary wagering game), or alternatively, it may be determined randomly after the player enters the virtual world of the secondary wagering game. For example, the amount of the credits awards 384 which a player's avatar 370 will eat in the Fish Tank Bonus shown may be predetermined during play of the primary wagering game 360 shown in the FIGURES. Thus, the player's "participation" in the secondary wagering game 380 "Fish Tank Bonus" may be merely a delayed display of a collection of that predetermined amount. In such an embodiment, the player's avatar swims through the Fish Tank and collects awards 384 totaling the predetermined amount and then the secondary wagering game 380 ends. In an alternative embodiment, the outcome of the player's participation is randomly determined during the time that the avatar 370 is in the virtual world of the secondary wagering game 380. Thus, a random number generator may control events such as where the avatar 370 navigates and which awards 384 are nearby, so as to make the player's collection of awards 384 a random event. In yet another alternative embodiment, the events may be partially random (as described) and partially dependent upon and influenced by certain attributes of the player's avatar, other avatars, and assets in the virtual world. One or more algorithms may be utilized to vary in real-time, or near real-time, the events transpiring in the virtual world.

The attributes of the player avatar may be the same for all players, or may be different. Thus, in an embodiment, the player can select which attributes they would like for their avatar to possess, in lieu of other attributes which they do not value. Many other attributes than the ones shown in the FIGURES are possible. Players may wager extra amounts, or use other forms of payment to improve the attributes of their avatars. Moreover, players may trade attributes, or earn increases and decreases in attributes as play in wagering games progresses.

The secondary display may include one or more displays to display the secondary wagering game. Moreover, the secondary wagering game, or portions thereof, may also be displayed on alternate displays. For example, portions of the secondary wagering game may be displayed on the primary display of a wagering device in the casino. Alternatively or additionally, portions of the secondary wagering game may be displayed remote from the casino, such as on a home computer, mobile telephone, personal digital assistant, computing device, or other wireless device. Moreover, the display of the participation of the player avatar in the secondary wagering game may be recorded on one or more components of the system for later playback and review. Thus, in an embodiment, the player may leave the casino to go home, eat a meal, or perform other activities. At such time that the player wishes, he may recall the display of the secondary wagering game on a remote display, such as at his home computer over the internet. The system can cause the secondary wagering game outcome to be replayed by recalling the recorded event and the outcomes therein which have been associated with the player's account. In other alternative embodiments, the player can recall the display of previous secondary wagering game outcomes from other locations, such as other gaming devices in a casino, or from a mobile device, which are in communication with the system described herein, over a wired or wireless network.

In yet other embodiments, the secondary wagering game 380 or other portions of the system 300 may utilize the remote devices mentioned to notify the player about certain events which have occurred. For example, the system 300 may relay certain statistics or events to a player's home computer, mobile phone, pager, or PDA using email, text messaging, instant messaging, or other protocols. A player may be permitted to customize a player messaging profile so as to choose when and how he is to be notified, and regarding which events, thresholds, etc. Thus, in an example, a player may receive a text message on his cellular phone when his fish avatar 370 has entered the Fish Tank Bonus, when it has exited the bonus, or when it has earned a certain threshold of credits (for example, 1,000 credits). Many other customization options may be utilized to allow a player to be remotely notified about various events relating to the game play and credit accumulation by the player's avatar 370 in the secondary wagering game 380.

In an embodiment, the virtual world of the secondary wagering game 380 shown in the FIGURES has its own expected value based upon the awards 384 available therein. The expected value of the secondary wagering game 380 may be fixed, or may vary over time. The expected value of the secondary wagering game 380 may also be dependent upon a variety of factors, such as the number of players (or avatars) present at any one time, the random creation, addition, and deletion of awards 384 from the game 380, or the attributes 372 assigned to the avatars in the game 380, and their interactions with one another. Thus, the secondary wagering game 380 may be configured in a variety of ways to provide awards 384 to players participating therein, such that desired expected values are met, or desired rates of expected value over time are preserved. In this way, the secondary bonus game 380 acts as a shared bonus pool available to a plurality of players.

For example, the secondary wagering game 380 may be configured to have an expected value over time of 750 credits per minute. Thus, on average, for each minute that a player's avatar participates in the "Fish Tank Bonus," for example, the player has an expected value of 750 credits. Of course on individual experiences or plays of the secondary wagering game, the player may earn greater or less than this amount per minute. Moreover, different player participating in the secondary wagering game 380 for different amounts of time may receive different total awards. However, on average, each player should receive the same rate of expected value of 700 credits per minute, as configured. To preserve this configuration, the secondary wagering game 380 may include one or more algorithms which redistribute or reassign credits or wealth within the virtual world. For example, if a player's avatar 370 collects an inordinately large amount of credits, an event (such as another fish stealing some credits from the player's avatar 370) may be introduced to lessen that player's share of the wealth in the virtual world.

In yet another embodiment, the secondary wagering game 380 (or a portion thereof) may include one or more progressive jackpots which are triggered by various events. In one embodiment, a player's passive participation in the secondary wagering game 380 includes that player being associated with a particular progressive jackpot. Thus, when a triggering event occurs in the secondary wagering game 380, the player is awarded a "personal" progressive jackpot, and the player's participation is not required in order for the jackpot to be awarded to him or her. In other configurations, the progressive jackpots may be configured in a variety of other manners for distribution to one or more eligible players.

Player avatars may be associated in groups or teams during participation in the secondary wagering game 380. Thus, players may individually earn awards 384 during their avatar's 370 participation in the virtual world of the secondary wagering game 380. Such individual awards 384 collected may be commingled into larger accounts associated with groups of players and redistributed in accordance with various rule sets. For example, in one embodiment, each player on a team receives a proportionate amount of the team's earnings in the secondary wagering game 380 regardless of his or her individual contribution to the group's total accumulated awards. In other embodiments, other rule sets or configurations may be utilized.

The secondary display 382 may further include input devices in communication therewith, for active or passive interaction with the virtual world of the secondary wagering game 380. Such input devices may provide inputs which cause amusing animations to take place (but do not affect the outcomes of the game 380), or alternatively, which may cause changes in movement of player avatars or other elements, thereby affecting certain outcomes of the secondary wagering game 380. For example, a touch screen overlying the secondary display 382 may sense tapping or touching by players or other observers of the secondary wagering game 380. Thus, a secondary display 382 (for example a plasma display) gives the appearance of being an actual fish tank, where the touch screen allows observers to "tap" on the "glass" of the tank. In response thereto, the players' avatars and other elements of the virtual world of the secondary wagering game 380 may react thereto. Interesting, entertaining and amusing animations may accompany the inputs detected from the various input devices. In one embodiment, a player could enter a player identifier or account number on an input device, and have one or more player avatars 370 associated with that player revealed. For example, by swiping a player tracking card located next to the secondary display 382, all of the player's fish swim up to the center of the display 382, so as to appear as if summoned or called by the player. In this way, the player can check the status, results or outcomes associated with his or her various avatars 370.

In an alternative embodiment, the player avatars 370 may be purchased, acquired, updated and/or monitored from a kiosk, home computer, stand alone computer, or other such device separate from a gaming device. For example, a player may be permitted to purchase and configure an avatar 370 for use in the secondary wagering game 380 at a kiosk. By inputting a certain amount of cash, credit, or funds, the player purchases a period of time for participation in the secondary wagering game 380 as described herein. Thus, rather than acquiring participation time during play of a primary wagering game 360, the player pays directly for participation in the secondary wagering game 380. Such purchases may be made at other computers, within or remote from the casino or operator's establishment. For example, such purchases may be made over the internet at a home computer, or by using a wireless device such as cellular phone or PDA. Moreover, such kiosks and other devices allowing purchases of participation in the secondary wagering game 380 may also permit configuration of player avatars 370 and other customization as described herein.

As indicated, a single player may have a plurality of avatars 370 associated with his player account. The avatars 370 may be theme specific (for example, one fish for the fishing themed game, one oil rig for the oil drilling game, etc.) or the player may be allowed to have more than one avatar 370 of each variety (multiple fish avatars for example). During play of the secondary wagering game 380, the player may be permitted to have a plurality of avatars 370 participating at once. For example, if the first triggering event causing the player's fish avatar 370 to enter the Fish Tank Bonus recurs while the player's fish is already in the Fish Tank, the player is permitted to send a second fish to the Fish Tank. Many other configurations of the secondary wagering game 380 may be utilized to permit each player to have a plurality of avatars participating.

The virtual world of the second wagering game 380 may also use one or more aspects of artificial intelligence to determine outcomes as the elements within the world interact. For example, artificial intelligence in the form of rule sets may resolve outcomes based upon one or more profiles (or set of attributes 372) of each participant. For example, player avatars 370 may have profiles which are compared with profiles of other players or elements within the virtual world during various interactions, and in accordance with one or more rule sets or algorithms. The resolution of those interactions causes one or more outcomes to occur (for example, one fish eating another fish and taking his awards). This leads to additional drama and excitement during play or display of the secondary wagering games 380. Players are able to associate negative results (their fish losing credits, for example) with deficiencies in the profiles of their avatars. This in turn causes the players to be more motivated to further customize the attributes 372 of their avatar 370 in an effort to improve their profiles for future participation in the secondary wagering game 380.

Moreover, players may be permitted to customize the performance of their avatar 370 in the virtual world of the secondary wagering game 380. For example, a player may configure his fish avatar 370 to "dive deep" for the first thirty seconds, then "swim near the surface" for the next thirty seconds, and finally stay in the middle region of the fish tank for one minute. By allowing these performance customizations, the player is given the perception of control over his avatar 370 in the secondary wagering game 380. The performance customizations may affect the outcomes of the secondary wagering game 380 in an embodiment. Alternatively, the customizations of performance may be independent of outcomes in the secondary wagering game 380, providing only entertainment, animation, and perception of skill.

Figure 9:
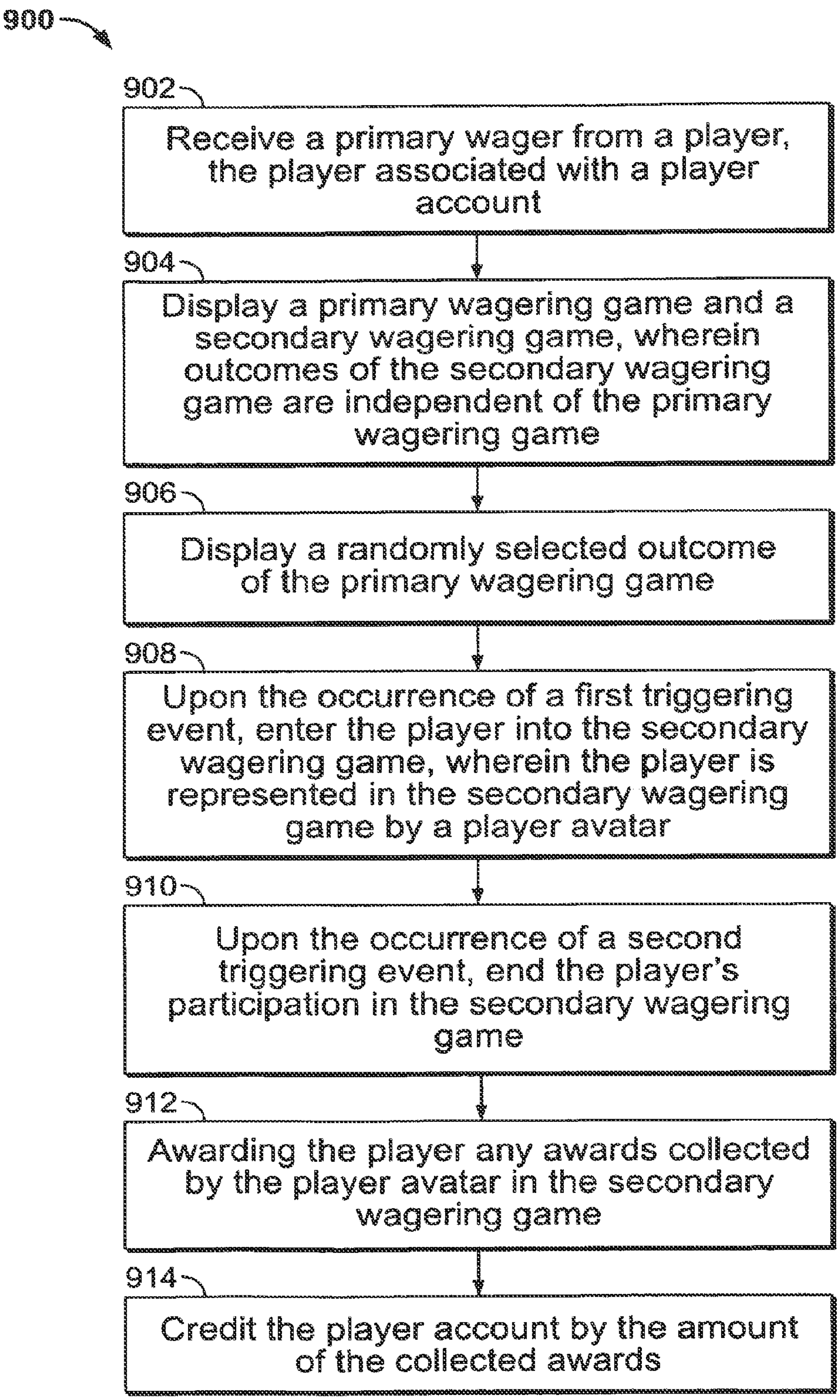
FIG. 9 is a flowchart of a method of operating a wagering game.

In FIG. 9, a method 900 of operating a wagering game is shown. At step 902; a primary wager is received from a player, the player associated with a player account. At step 904, a primary wagering game and a secondary wagering game are displayed, wherein outcomes of the secondary wagering game are independent of the primary wagering game. In an embodiment, the primary and secondary wagering games are displayed on the same display. In alternative embodiments, the primary and secondary wagering games are displayed on separate displays. At step 906, a randomly selected outcome of the primary wagering game is displayed. At step 908, upon the occurrence of a first triggering event, the player is entered into the secondary wagering game. The player is represented in the secondary wagering game by a player avatar. At step 910, upon the occurrence of a second triggering event, the player's participation in the secondary wagering game is ended. At step 912, the player is awarded any awards collected by the player avatar in the secondary wagering game. At step 914, the player account is credited by the amount of the collected awards.

Figure 10:
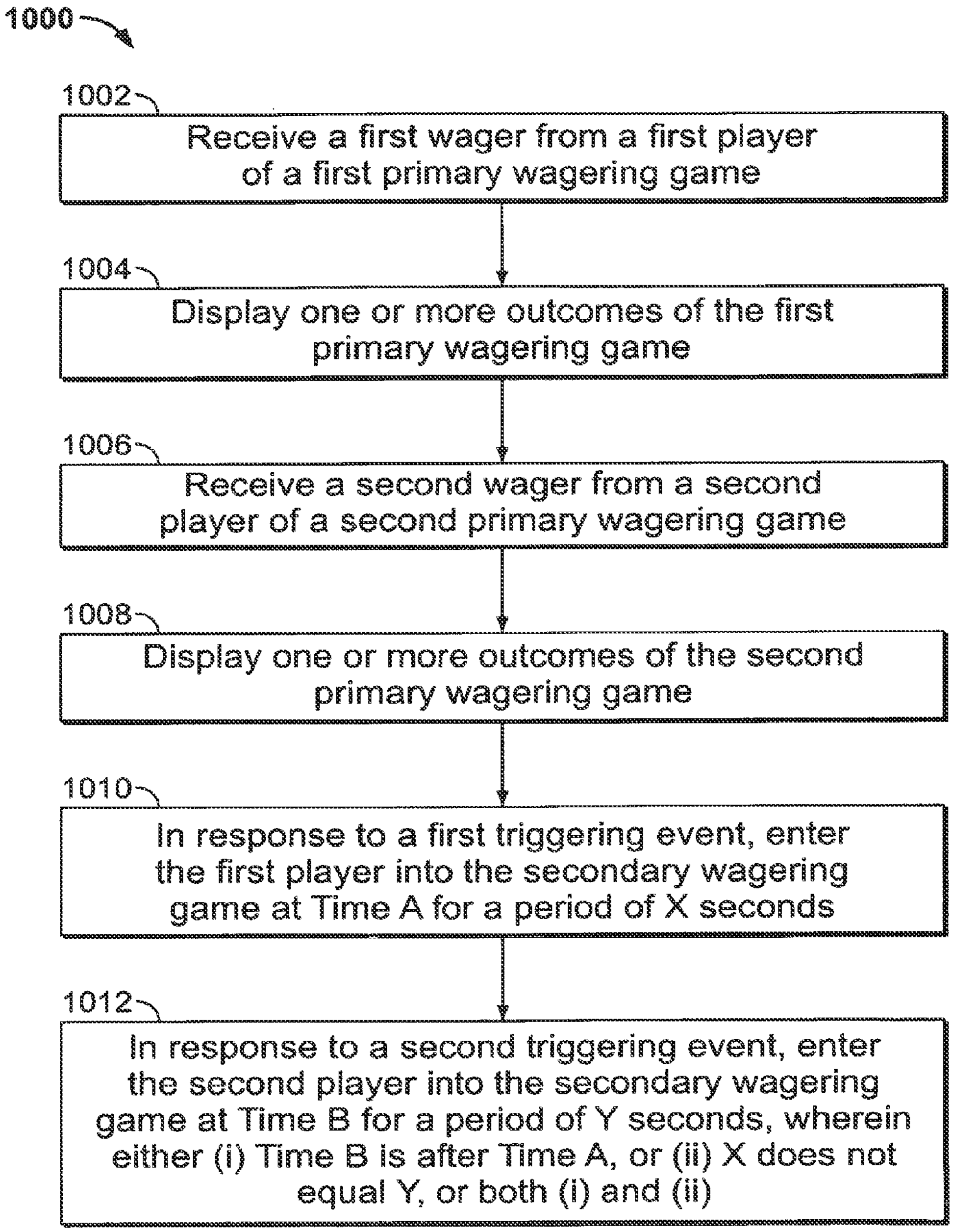
FIG. 10 is a flowchart of a method of operating a secondary wagering game.

In FIG. 10, a method 1000 of operating a secondary wagering game is shown. At step 1002, a first wager is received from a first player of a first primary wagering game. At step 1004, one or more outcomes of the first primary wagering game are displayed. At step 1006, a second wager is received from a second player of a second primary wagering game. At step 1008, one or more outcomes of the second primary wagering game are displayed. At step 1010, in response to a first triggering event, the first player is entered into the secondary wagering game at Time A for a period of X seconds. At step 1012, in response to a second triggering event, the second player is entered into the secondary wagering game at Time B for a period of Y seconds, wherein either (i) Time B is after Time A, or (ii) X does not equal Y, or both (i) and (ii).

In this way, the first player and second player may have the same or different start times in the secondary wagering game, and may have the same or different lengths of participation in the secondary wagering game, or both. In one embodiment, player one starts the secondary wagering game before player two, but player two finishes before player one. In another embodiment, player one starts the secondary wagering game before player two, and finishes before player two finishes. In yet another embodiment, players one and two start the secondary wagering game simultaneously, but finish at different times. In yet another embodiment, players one and two start the secondary wagering game at different times, but finish at the same time. Other possibilities and configurations exist.

The system and methods described herein offers a number of benefits and advantages over traditional gaming systems. The system allows passive player participation in a secondary wagering game without requiring the presence of the player. Thus, the awards earned in the secondary wagering game are truly perceived as gratuitous and something extra as compared to awards won during the primary wagering game. Moreover, the system allows a player to remain in a casino, for example, and passively participate by watching his avatar participate in the secondary wagering game, while perhaps the player eats a meal or relaxes. The player may even leave the casino and learn of the results of his avatar's participation in the secondary wagering game at a later time. Because the avatar is linked to the player's account, a number of options are available to the player to see, replay, review, watch, or learn of the results of the secondary wagering game. Thus, because the system employs account based wagering, it offers the benefits of passive participation as described herein. Moreover, the configuration of the passive gaming experience offers incentives for players to sign up for, and receive, player accounts. Thus, a gaming operator such as a casino, receives additional benefits from the increased number of players having player accounts, such as being able to track game play data, and to award additional prizes and complimentary services to such players.

Each of these embodiments and obvious variations thereof is contemplated as falling within the spirit and scope of the claimed invention, which is set forth in the following claims.

What is claimed is:

1. A gaming system comprising:

a gaming machine including an electronic display device and a value input device, the electronic display device configured to display a wagering game; and one or more controllers configured to:

detect, via the value input device, a physical item associated with a monetary value that establishes a credit balance;

receive wagers from a player to play a primary wagering game at the gaming machine during a gaming session, the wagers being covered by the credit balance;

in response to a first triggering event at the gaming machine, initiate the player's participation in a secondary game that occurs at least in part after the gaming session is terminated;

in response to a second triggering event, terminate the player's participation in the secondary game; and credit an account of the player with an award resulting from the player's participation in the secondary game.

2. The gaming system of claim 1, wherein the first triggering event includes one or more of termination of the gaming session, an outcome in the primary wagering game, an amount of time of the gaming session, or an amount of the wagers during the gaming session.

3. The gaming system of claim 1, wherein the one or more controllers initiate the player's participation in the secondary game further in response to the player satisfying an eligibility criterion during the gaming session.

4. The gaming system of claim 1, wherein the secondary game occurs without player interaction.

5. The gaming system of claim 1, wherein the secondary game includes a virtual world, wherein the one or more controllers are further configured to represent the player in the virtual world with an avatar that interacts with elements of the virtual world.

6. The gaming system of claim 5, wherein the award is accumulated as the avatar interacts with the elements of the virtual world.

7. The gaming system of claim 5, wherein the one or more controllers are further configured to enable the player to customize attributes or performance of the avatar, the award being dependent upon the attributes or the performance.

8. The gaming system of claim 1, wherein the second triggering event is expiration of eligibility time acquired from play of the primary wagering game.

9. The gaming system of claim 8, wherein the electronic display device displays the eligibility time in a bonus time meter.

10. The gaming system of claim 1, wherein the award is predetermined during the gaming session.

11. The gaming system of claim 1, wherein the award is randomly determined in real time after termination of the gaming session.

12. The gaming system of claim 1, wherein the one or more controllers are further configured to allow the player to monitor the secondary game from a device separate from the gaming machine.

13. A method of operating a gaming system including one or more controllers and a gaming machine, the gaming machine including an electronic display device and a value input device, the electronic display device configured to display a wagering game, the method comprising:

detecting, via the value input device, a physical item associated with a monetary value that establishes a credit balance;

receiving wagers from a player to play a primary wagering game at the gaming machine during a gaming session, the wagers being covered by the credit balance;

in response to a first triggering event at the gaming machine, initiating the player's participation in a secondary game that occurs at least in part after the gaming session is terminated;

in response to a second triggering event, terminating the player's participation in the secondary game; and crediting an account of the player with an award resulting from the player's participation in the secondary game.

14. The method of claim 13, wherein the first triggering event includes one or more of termination of the gaming session, an outcome in the primary wagering game, an amount of time of the gaming session, or an amount of the wagers during the gaming session.

15. The method of claim 13, wherein the initiating is further in response to the player satisfying an eligibility criterion during the gaming session.

16. The method of claim 13, wherein the secondary game includes a virtual world, and further including representing the player in the virtual world with an avatar that interacts with elements of the virtual world, the award being accumulated as the avatar interacts with the elements of the virtual world.

17. The method of claim 13, wherein the second triggering event is expiration of eligibility time acquired from play of the primary wagering game, wherein the display device displays the eligibility time in a bonus time meter.

18. The method of claim 13, wherein the award is predetermined during the gaming session.

19. The method of claim 13, wherein the award is randomly determined in real time after termination of the gaming session.

20. The method of claim 13, allowing the player to monitor the secondary game from a device separate from the gaming machine.

* * * * *